US006760343B1

(12) United States Patent
Krishnamurthy et al.

(10) Patent No.: US 6,760,343 B1
(45) Date of Patent: Jul. 6, 2004

(54) METHOD AND APPARATUS FOR PROVIDING A VIRTUAL SS7 LINK IN A COMMUNICATIONS SYSTEM

(75) Inventors: Shridhar Krishnamurthy, Coppell, TX (US); Jogen Kanubhai Pathak, Dallas, TX (US); Steve William Racz, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/315,170

(22) Filed: May 20, 1999

(51) Int. Cl.[7] .................................................. H04J 3/22
(52) U.S. Cl. ........................ 370/466; 370/401; 370/338
(58) Field of Search ................................. 370/410, 466, 370/467, 469, 328, 401, 402, 356, 355, 389, 385, 395.5, 395.51, 395.52

(56) References Cited

U.S. PATENT DOCUMENTS

| | | | | |
|---|---|---|---|---|
| 5,640,446 A | * | 6/1997 | Everett et al. | 379/114.28 |
| 5,706,286 A | * | 1/1998 | Reiman et al. | 370/401 |
| 5,793,771 A | * | 8/1998 | Darland et al. | 370/467 |
| 5,966,431 A | * | 10/1999 | Reiman et al. | 379/115.01 |
| 6,026,086 A | * | 2/2000 | Lancelot et al. | 370/353 |
| 6,044,081 A | * | 3/2000 | Bell et al. | 370/401 |
| 6,160,874 A | * | 12/2000 | Dickerman et al. | 379/114.19 |
| 6,195,425 B1 | * | 2/2001 | Farris | 379/230 |
| 6,208,657 B1 | * | 3/2001 | Dendi et al. | 370/401 |
| 6,215,783 B1 | * | 4/2001 | Neyman | 370/353 |
| 6,229,819 B1 | * | 5/2001 | Darland et al. | 370/467 |
| 6,292,479 B1 | * | 9/2001 | Bartholomew et al. | 370/352 |
| 6,324,183 B1 | * | 11/2001 | Miller et al. | 340/467 |
| 6,411,632 B2 | * | 6/2002 | Lindgren et al. | 370/466 |
| 6,442,169 B1 | * | 8/2002 | Lewis | 370/401 |
| 6,463,052 B1 | * | 10/2002 | Christie | 370/352 |
| 2001/0002198 A1 | * | 5/2001 | Lindgren et al. | 370/466 |

* cited by examiner

*Primary Examiner*—Douglas Olms
*Assistant Examiner*—Van Nguyen

(57) ABSTRACT

A method, apparatus, and instructions for establishing a virtual communication channel between applications on different nodes in which one node may be using a communication protocol stack based on one protocol, such as SS7, and another node may be using a communication protocol stack based on another protocol, such as IP. Alternatively, a virtual communication channel may be provided between applications on different nodes in which both nodes use a communication protocol stack based on IP to communicate with each other, but carry SS7 traffic through the communication channel. A gateway is provided in which both SS7 and IP are supported. The gateway allows for logical transport of signaling messages between peer applications on different nodes. Messages for SS7 are placed in data packets for transport to a destination using an IP connection or link to the destination. Header information also is placed into the data packet to allow for routing of the messages when the packet is received at the destination.

28 Claims, 10 Drawing Sheets

| HEADER 8 BYTES | GATEWAY HEADER 34 BYTES | MESSAGE |
|---|---|---|
| 702 | 704 | 706 |

| | Field Name | Length (Bytes) | Description | Default Value | Range | Remarks |
|---|---|---|---|---|---|---|
| 800 | Network type | 1 | Target Network (IS41, GSM, etc.) | 0 | 1=IS41 2=GSM 0=Test | All other values are reserved. Test message is used for debugging purposes only and only protocol version field is valid. |
| 802 | Protocol Version | 1 | Implementation of protocol between gateway and application | | 1.0 to 10.10 | BCD encoded major and minor version identifiers |
| 804 | UDT Data Format | 1 | UDT data format for decoding messages | 0 | 0=ITU-T 1=ANSI 2=NTC | All other values are reserved |
| 806 | Sequence Control | 1 | Indicates whether the use of SLS is required | — | — | Advisory parameter specified by the client node for data transfer in SS7 network to the SS7 gateway |
| 808 | SCCP Class | 1 | SCCP class information. Refer to Q.711 for further information | 0 | — | To decode the message and create a message for forwarding to SS7 network |
| 810 | Return Info | 1 | SCCP Return Option or Reason | 0 | — | As defined by Q.711 |
| 812 | Called Party Address | 10 | SCCP called party address or destination address | 0 | — | Refer to SCCP addressing scheme. MS byte is reserved |
| 814 | Calling Party Address | 10 | SCCP calling party address or originating address | 0 | — | Refer to SCCP addressing scheme. MS byte is reserved |
| 816 | Spare | 6 | — | — | — | — |
| 818 | Data Length | 2 | Data length of the payload | 0 | 0-2~32 | The size of payload |
| 820 | | | | | | |

FIG. 8

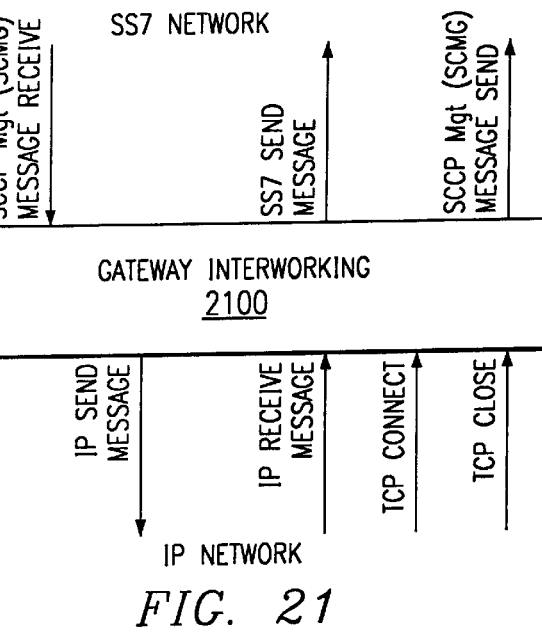
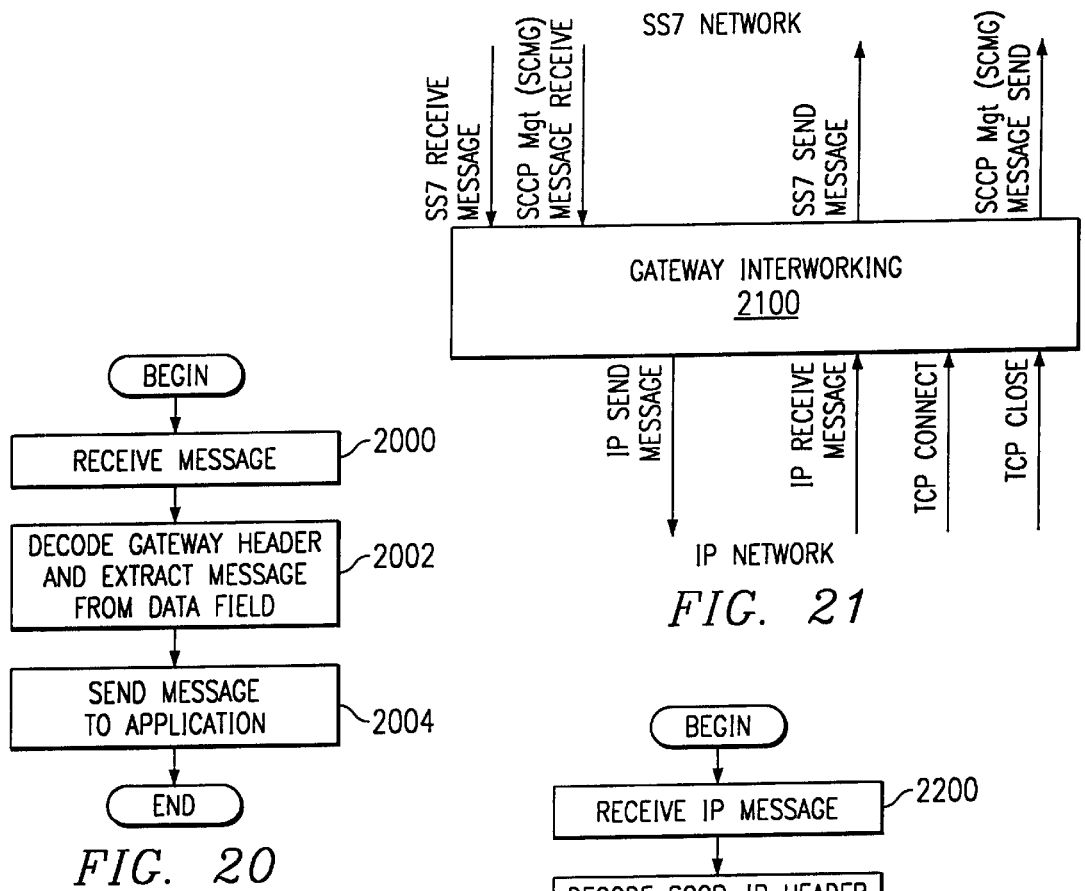
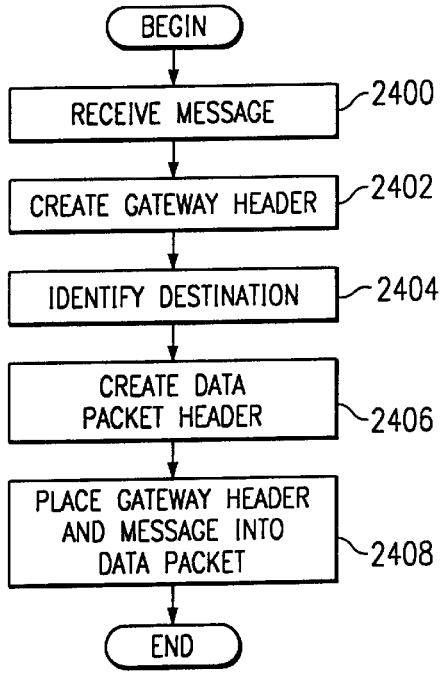
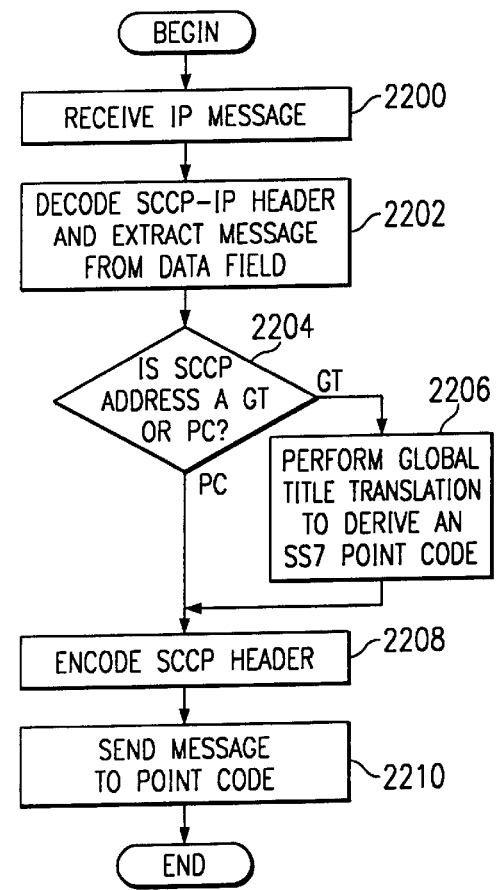
FIG. 21
FIG. 20
FIG. 24
FIG. 22

METHOD AND APPARATUS FOR PROVIDING A VIRTUAL SS7 LINK IN A COMMUNICATIONS SYSTEM

FIELD OF THE INVENTION

The present invention relates generally to data transport and in particular to a method and apparatus for sending and receiving messages between two nodes in a communications system.

BACKGROUND OF THE INVENTION

Signaling system number 7 (SS7) is a digital signaling standard developed by the International Telecommunication Union (ITU)—Telecommunications Standard Society (TSS). SS7 is the protocol for data communications in a communications system. In communications systems, a SS7 network is present, which is separate from the voice network. The SS7 network is used solely for the purpose of switching data messages pertaining to the business of connecting telephone calls and maintaining the signaling network. Common Channel Signaling (CCS) is the technology used in SS7 networks. CCS uses a digital facility, but places signaling information in a time slot or channel separate from the voice and data to which it is related. This mechanism allows signaling information to be consolidated and sent through its own network apart from the voice network. A packing switching system is the mechanism used for transferring messages throughout the network.

All nodes in a SS7 network are called "signaling points". A signaling point has an ability to perform message discrimination (read the address and determine if the address is for that node), as well as to route the SS7 messages to another signaling point. The main type of signaling points is a service switching point (SSP), which is a local exchange in a telephone network. A SSP may be a combination of a voice switch and a SS7 switch, or an adjunct computer connected to the local exchange's voice switch. The SSP provides the functionality of communicating with the voice switch via the use of primitives and creating packets, or signal units needed for transmission in a SS7 network. Another signaling point is a signal transfer point (STP), which serves as a router in the SS7 network. All SS7 packets travel from one SSP to another through the services of a STP. Another signaling point is a service control point (SCP), which serves as an interface to telephone company databases.

SS7 is used in cellular networks to provide signaling information required to establish and disconnect circuit connections, as well as share database information from one institute to another. A mobile switching center (MSC) in a communications system connects to the SS7 via a signaling transfer point. The SS7 network is instrumental in collocating all the cellular providers together and allowing their various databases to be shared with each other. For example, the home location register (HLR) is a database used to store information about users of a cellular network. A visitor location register (VLR) is a database used to store temporary subscriber information when that subscriber is visiting the coverage area. This information is retrieved from the subscriber's HLR. With SS7 signaling through a SS7 network, data stored in a HLR can be stored with other MSCs across the SS7 network.

With the rapid expansion of communication systems, such as cellular networks, the expansion of SS7 networks has been limited and regulated. Concerns about capacity of SS7 links and the cost associated with expanding and creating SS7 networks for communication systems has made the development and expansion of communication systems, such as cellular systems, costly. In addition, with increased traffic on SS7 networks, concerns regarding congestion and flow control are present.

Therefore, it would be advantageous to have an improved method and apparatus for transporting messages in a SS7 network.

SUMMARY OF THE INVENTION

The present invention overcomes congestion and flow concerns in signaling networks, such as SS7 networks, by providing a virtual communications link or connection between various nodes in a SS7 network. The virtual link is provided by gateways, which send SS7 messages over a network link, such as an Internet protocol link. The present invention provides a method, apparatus, and instructions for establishing a virtual communication channel between applications on different nodes in which one node may be using a communication protocol stack based on one protocol, such as SS7, and another node may be using a communication protocol stack based on another protocol, such as IP. Alternatively, a virtual communication channel may be provided between applications on different nodes in which both nodes use a communication protocol stack based on IP to communicate with each other, but carry SS7 traffic through the communication channel. A gateway is provided in which both SS7 and IP are supported. The gateway allows for logical transport of signaling messages between peer applications on different nodes. Messages for SS7 are placed in data packets for transport to a destination using an IP connection or link to the destination. Header information also is placed into the data packet to allow for routing of the messages when the packet is received at the destination.

The link or connection may be to another gateway or to a node, which extracts the message and header information from the data packet and sends it on to the appropriate node using the header information.

The mechanism of the present invention provides for internetworking addressing schemes between both SS7 and Transport Control Protocol/Internet Protocol (TCP/IP). In addition, the present invention allows for addition of nodes without requiring expansion of an existing SS7 network.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is an illustration of a data packet sent over an IP network by a gateway depicted in accordance with a preferred embodiment of the present invention;

FIG. 8 is a table of fields used in a gateway header depicted in accordance with a preferred embodiment of the present invention;

FIG. 20 is a flowchart of a process for processing received messages depicted in accordance with a preferred embodiment of the present invention;

FIG. 21 is a block diagram of data flow in a gateway internetworking unit depicted in accordance with a preferred embodiment of the present invention;

FIG. 22 is a flowchart of a process for receiving messages depicted in accordance with a preferred embodiment of the present invention;

FIG. 24 is a flowchart of a process for encapsulating a message into a data packet depicted in accordance with a preferred embodiment of the present invention.

DETAILED DESCRIPTION OF THE PREFERRED EMBODIMENT

Figure 1:
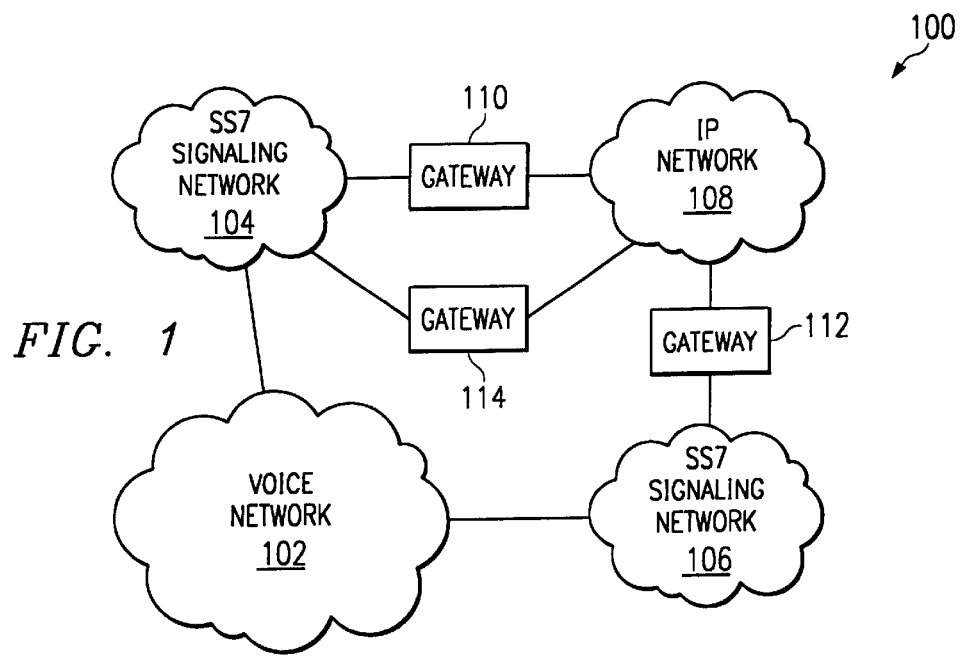
FIG. 1 is a diagram of a communications system depicted in accordance with a preferred embodiment of the present invention.

With reference now to the figures, and in particular with reference to FIG. 1, a diagram of a communications system is depicted in accordance with a preferred embodiment of the present invention. Communications system 100 includes a voice network 102, signaling network 104, signaling network 106, and an Internet protocol (IP) network 108. Voice network 102 carries voice data for various calls within communications system 100. In the depicted example, signaling network 104 and signaling network 106 are SS7 networks, which are separate from voice network 102 and are used for the purpose of switching data messages pertaining to call control signaling for telecommunications services within voice network 102. Signaling network 104 uses a common channel signaling (CCS) in which a single channel conveys, by various labeled messages, signaling information relating to various circuits or other information such as that used for a network management.

In the depicted examples, messages are generated by a user or processor pertaining to call management within voice network 102 as part of the signaling in a signaling network, which is a set of transport facilities that carry signals. A SS7 network is a signaling network. Signaling network 104 and signaling network 106 are examples of a signaling network. Signaling is used to establish a connection, to monitor and supervise the status of the connection, and to terminate the connection. Signaling is the act of transferring this information between nodes. Signals, also referred to as signaling data, may include data signals, control signals, timing signals, but exclude voice. A data link is a connection between two nodes used to transfer signaling information between nodes. A data link as used herein excludes voice.

The present invention provides a mechanism in which messages using SS7 may be transferred outside of signaling network 104 to a node within signaling network 106. The messages may be sent through IP network 108 through gateway 110 and gateway 112. These gateways provide a mechanism for carrying messages from signaling network 104 to signaling network 106 in a manner that is transparent to various nodes within these SS7 networks. Gateways 110 and 112 may be used to connect two nodes over a standard transmission control protocol/Internet protocol (TCP/IP) used for data transmission of SS7 messages over networks, such as the Internet. IP is the protocol within TCP/IP that governs the breakup of data messages into packets, the routing of the packets from sender to destination network and station, and the reassembly of the packets into the original data messages at the destination. IP corresponds to the network layer in the ISO/OSI model. TCP is the protocol within TCP/IP that governs the breakup of data messages into packets to be sent via IP, and the reassembly and verification of the complete messages from packets received by IP. TCP corresponds to the transport layer in the ISO/OSI model.

Further, data may be transfer to other nodes within signaling network 104 through IP network 108. This communications link is created through gateway 110 and gateway 114. Messages within a node in signaling network 104 may be sent to another node in signaling network 104 using a communications link established through gateway 110 and gateway 114. Messages are transferred through gateway 110 onto IP network 108 to gateway 114 and to another node within signaling network 104. In this manner, additional expansion of signaling network 104 is unnecessary and communications links established between gateway 110 and gateway 114 may be used to transport data messages when congestion occurs within various points within signaling network 104.

The use of IP network 108 to transport messages provides an advantage over current SS7 signaling because IP has a greater bandwidth. Currently, SS7 networks nominally have a 64K-transfer rate. In some cases, the rates may be 1.544 Mbps or 2.048 Mbps. IP networks can handle up to 100 Mbps. Further, extensive IP networks are present and available for use and do not require the same expense as expanding or creating SS7 networks.

Figure 2:
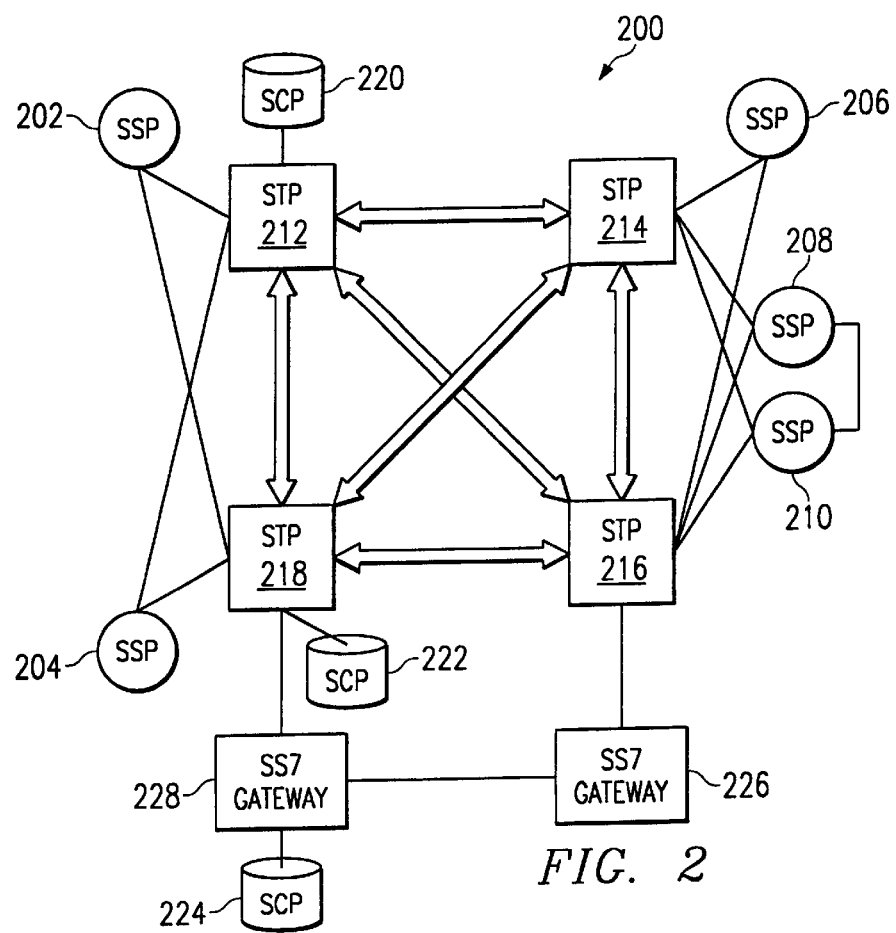
FIG. 2 is a diagram of a SS7 network depicted in accordance with a preferred embodiment of the present invention.

For example, in typical SSP connection scenario, a mobile switching center (MSC) is connected to another MSC with STP functionality. In accordance with a preferred embodiment of the present invention, a TCAP encoded Mobile Application Part (MAP) message is wrapped in a special "SCCP-IP" header and transmitted over IP to an intermediate node. The intermediate node receives the payload, unwraps the "SCCP-IP" header, re-wraps it into a standard SCCP header and transmits it using Message Transfer Part (MTP) of SS7 to the destination node. The intermediate node may also transmit the message to an IP node with no modification. On this manner, the mechanism of the present invention may be used for peer to peer communication in a fashion similar to that in a SS7 network. The protocol can connect any client node to any SS7 node for connecting to the SS7 network. Further, the mechanism of the present invention may be used to connect a node that does not communicate over SS7 with a node within the SS7 network. With reference now to FIG. 2, a diagram of a SS7 network is depicted in accordance with a preferred embodiment of the present invention. In this example, signaling network 200 is a SS7 network, which includes service-switching points (SSPs) 202–210, signal transfer points (STPs) 212–218 and service control points (SCPs) 220–224. An SSP is a local exchange in a telephone network and may be a combination of a voice switch and a SS7 switch, or an adjunct computer connected to a voice switch and the local exchange. SSPs provide the functionality of communicating with the voice switch via the use of primitives and creating packets, or signaling units, needed for transmission in signaling network 200. SSP 208 and SSP 210 may establish a voice trunk between the two exchanges, but establish this trunk via a signaling path through STPs 214 and 216 within signaling network 200.

A STP serves as a router in the SS7 network. A SCP serves as an interface to a database in the communications system. Databases are typically used to store information about subscriber services, routing and special service numbers, such as 800 and 900 numbers, calling card validation, and fraud protection. For example, a home location register (HLR) contains a database, which is found in cellular networks and is used to store information regarding a cellular subscriber. The HLR stores information regarding billing, services allowed, and the current location of the cellular phone. A visitor location register (VLR) is used to store data about a subscriber whenever the subscriber is registered in the area served by that MSC whether or not the subscriber is local. HLR data is always forwarded to the VLR. The HLR from which it gets the subscriber data may be local or remote. The VLR is used to store current locations for visiting subscribers. The VLR communicates this information to the HLR to allow the HLR to track subscriber locations. In the depicted examples, VLR and HLRs are colocated with a MSC and are also SSPs.

In addition, signaling network 200 also includes gateways 226 and 228, which may be used as an alternative path to connect SCP 222 to STP 216. Alternatively, gateways 226 and 228 may be used to form a connection between STP 216 and STP 218. Gateway 228, may provide a connection between STP 218 and SCP 224, which is a SCP not normally connected to signaling network 200. Gateway 228 provides a connection between STP 218, which communicates using SS7 while SCP 224 is accessed using another protocol, such as IP. Computers are used at these signaling points to perform signaling functions.

Figure 3:
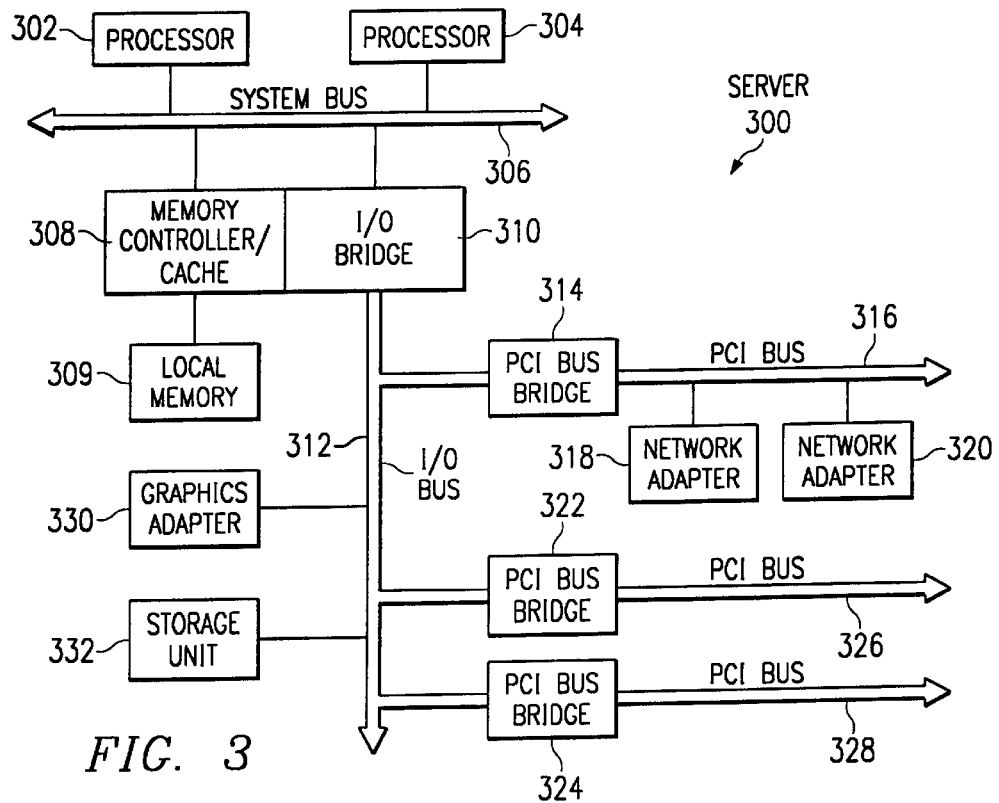
FIG. 3 is a block diagram of a data processing system, which may be implemented as a gateway, depicted in accordance with a preferred embodiment of the present invention.

Referring to FIG. 3, a block diagram of a data processing system, which may be implemented as a gateway, is depicted in accordance with a preferred embodiment of the present invention. Data processing system 300 may be used to implement gateways, such as gateways 110, 112, and 114 in FIG. 1 or gateways 226 and 228 in FIG. 2.

Data processing system 300 may be a symmetric multi-processor (SMP) system including processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI bus 316. Typical PCI bus implementations will support four PCI expansion slots or add-in connectors. Communications links to other computers or nodes in signaling network 104, signaling network 106 or IP network 108 in FIG. 1 may be provided through network adapter 318 and network adapter 320 connected to PCI local bus 316 through add-in boards. Network adapter 318 may provide communications with a SS7 network while network adapter 320 may provide communication with an IP network.

Additional PCI bus bridges 322 and 324 provide interfaces for additional PCI buses 326 and 328, from which additional modems or network adapters may be supported. In this manner, server 300 allows connections to multiple nodes on different networks. A memory-mapped graphics adapter 330 and storage unit 332 may also be connected to I/O bus 312, either directly or indirectly. Storage unit 332 may be implemented in a number of ways. For example, storage unit 332 may be a hard disk or an array of hard disks. Additionally, storage unit 332 may be a heterogeneous storage system containing devices, such as hard disks, DVD drives, and tape drives. With this system, the process of the present invention may be executed by processors 302 and 304 through instructions and data located in local memory 309 and storage unit 332.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
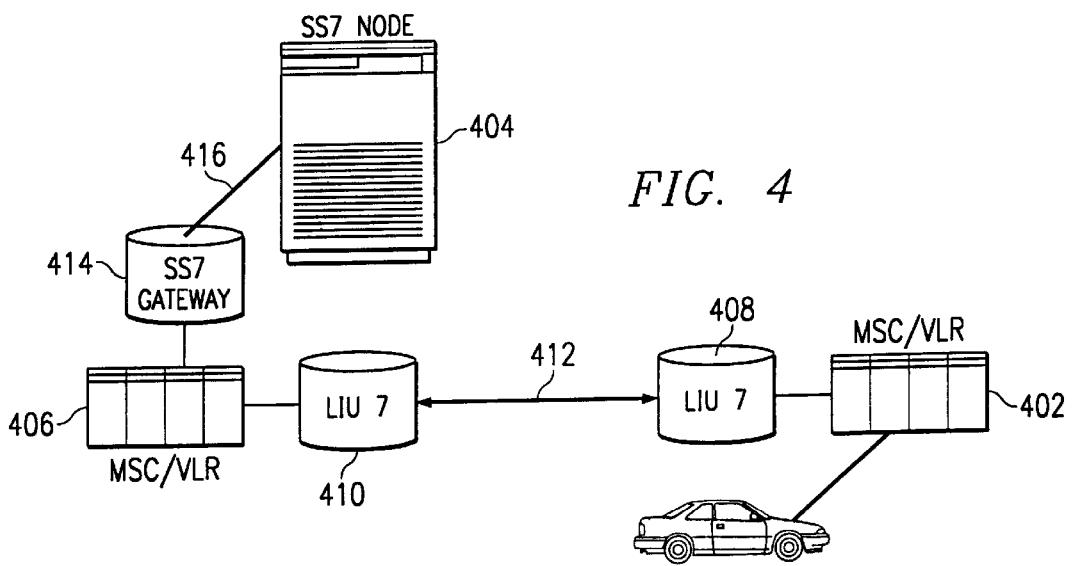
FIG. 4 is a diagram illustrating a SS7 gateway used as an interface between a SS7 network node and a SS7 network depicted in accordance with a preferred embodiment of the present invention.

With reference now to FIG. 4, a diagram illustrating a gateway used as an interface between a SS7 network node and a SS7 network is depicted in accordance with a preferred embodiment of the present invention. In this example, MSC/VLR 400 may communicate with SS7 node 404 through switch 406. Link interface unit (LIU) 408 and link interface unit (LIU) 410 are used to establish SS7 link 412. Messages may be sent to SS7 node 404 via gateway 414, which establishes an IP link 416 with node 404 in this example. Node 404 may be connected to a SS7 network (not shown).

Figure 5:
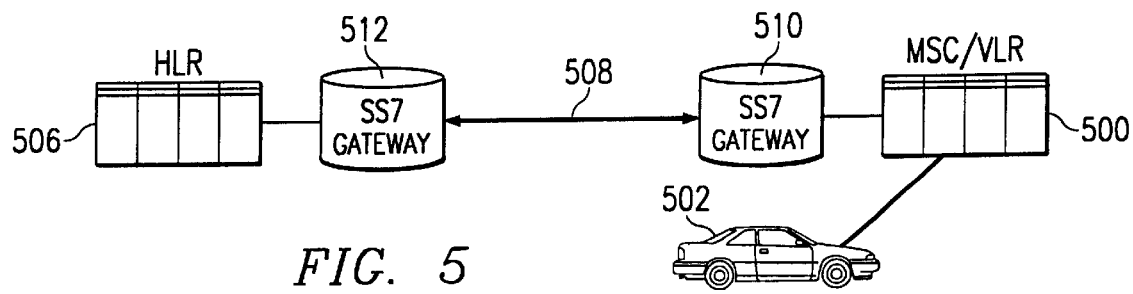
FIG. 5 is a diagram of a virtual SS7 link created by gateways depicted in accordance with a preferred embodiment of the present invention.

Turning next to FIG. 5, a diagram of a virtual SS7 link created by gateways is depicted in accordance with a preferred embodiment of the present invention. In this example, MSC/VLR 500 may register information from mobile station 502, which is in the area managed by MSC/VLR 500. Mobile station 502 is a visitor in this area and information about mobile station 502 is stored within VLR 500. In addition, information is sent to HLR 506 so that HLR 506 may track the location of mobile station 502. In the depicted example, this information is sent over virtual SS7 link 508, which is an IP link carrying SS7 traffic using IP packets. Virtual SS7 link 508 is established between SS7 gateway 510 and SS7 gateway 512. SS7 messages are encapsulated in IP packets for transport over virtual SS7 link 508. In this instance, virtual SS7 link 508 acts as a high-capacity traffic tunnel for carrying SS7 traffic between MSC/VLR 500 andHLR 506. This link may be used when current bandwidth within a SS7 network is insufficient to support applications like LNP or due to the number of subscribers. Alternatively, the virtual SS7 link may be used as a permanent connection to carry SS7 traffic. In this manner, peer to peer communication in a fashion similar to that on a SS7 network may be provided. Thus, the present invention allows for expansion of SS7 message transport when current SS7 networks are at capacity using a less costly infrastructure.

Figure 6:
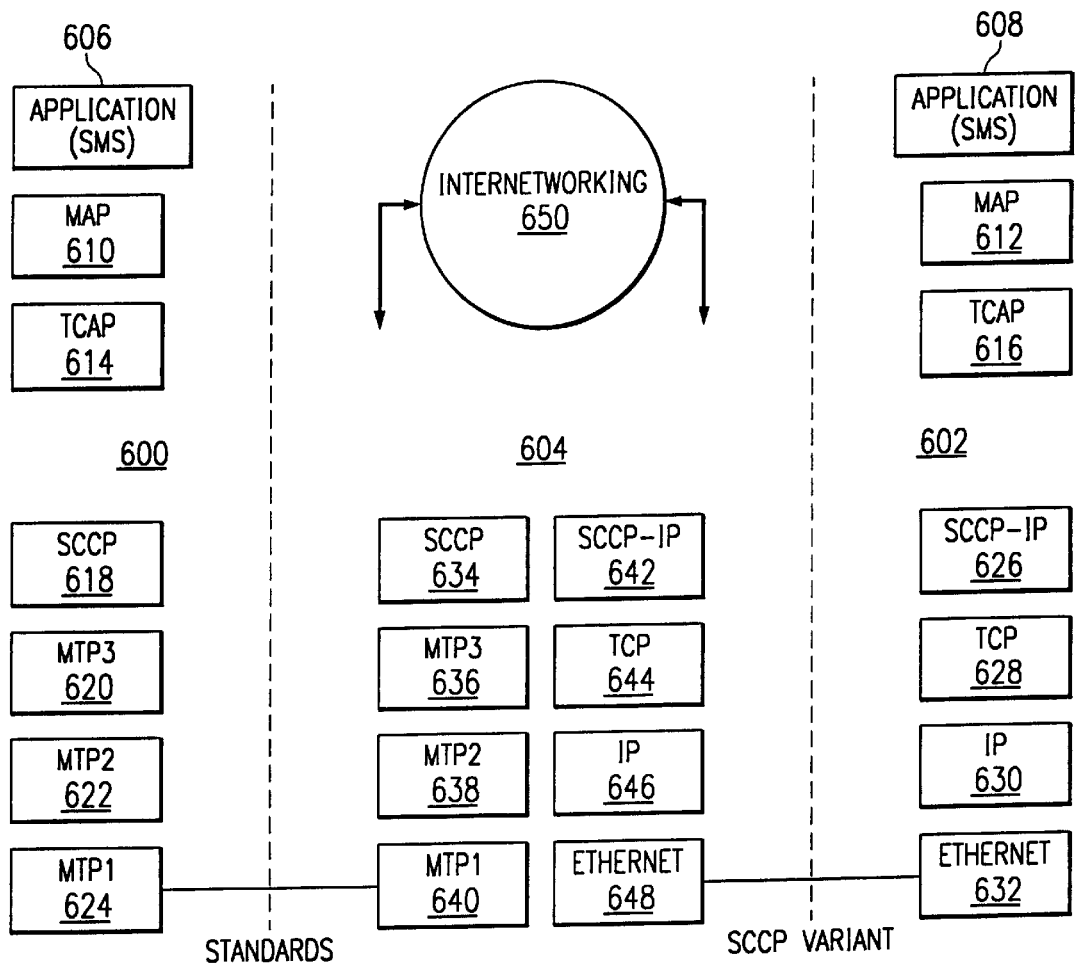
FIG. 6 is a diagram illustrating the various components used in providing a virtual SS7 connection depicted in accordance with a preferred embodiment of the present invention.

Turning now to FIG. 6, a diagram illustrating the various components used in providing a virtual SS7 connection is depicted in accordance with a preferred embodiment of the present invention. In this example, a node 600 may exchange messages with another node 602 through a gateway 604. In this example, node 600 is connected to a SS7 network, while node 602 is connected to an IP network. Node 600 may be a node, such as MSC/VLR 406 in FIG. 4, while node 602 may be an SS7 node, such as SS7 node 404 in FIG. 4. In such an instance, a IP link, such as IP link 416, is the connection used to carry traffic between node 602 and node 604, while communications between node 600 and 604 may be established through an SS7 link, such as SS7 link 412 in FIG. 4.

Gateway 604 provides a bridge between the SS7 network and the IP network and provides the mechanism to allow transfer of SS7 messages between node 600 and node 602. Application 606 in this example is a short message service (SMS).In this example, the message is sent by application 608 using mobile application part (MAP) 610, which in this example is used for a global system for mobile communications (GSM) wireless network. MAP is used in cellular networks to provide a mechanism by which cellular subscriber information may be passed from one cellular network to another. Transaction capabilities application part (TCAP) 614 is a protocol is an encoding scheme used to allow peer applications to establish, maintain, and terminate massaging dialogs. TCAP 614's functions include functions, such as those required to connect to an external database, perform a query of the database, and retrieve information. In this example, no changes to software or protocol layers are required in the SS7 nodes. All functionality for transporting data between SS7 and IP networks is provided through the gateway. The information or data retrieved is then sent back in the form of a TCAP message to the node requesting the information. TCAP also supports remote control of other entities within a SS7 network.

Node 600 communicates using SS7 protocols. In particular, node 600 includes signaling connection control part (SCCP) 618. SCCP 618 is a protocol used for accessing remote applications and other entities. SCCP 618 provides the address necessary to route a message to the correct application, such as, for example, a database. These addresses are also called subsystem numbers and are logical addresses used by the protocols to route a message to the appropriate application entity. SCCP 618 also is considered part of layer 3 in an International Organization for Standardization Open Systems Interconnect (ISO/OSI) model. SCCP 618 relies on the services of a message transfer part (MTP), which acts as a carrier for all SS7 messages to provide reliable transfer of messages from one signaling point to another signaling point. In this example, MTP includes message transfer part level 3 (MTP3) 620, message transfer part level 2 (MTP2) 622, and message transfer part level 1 (MTP1) 624. The MTP provides the same functionality as layers 1, 2, and 3 in the ISO/OSI model. These layers are the physical, data link, and network layers in OSI. SCCP 618 provides a means for end to end routing while MTP is capable of only point to point routing. As a result, a message can be routed only on the physical links available from a signaling point. SCCP 618 provides addressing to route a message through the entire network with this information being used by each signaling point by MTP3 620 to determine which link set to use. MTP2 622 provides functions necessary to provide error detection and correction for signaling units. MTP1 624 is a physical layer, which allows for the use of any digital type interface supporting the data rate required by the network. MTP3 620 provides for message routing, message discrimination, message distribution, and network management.

In contrast, node 602 communicates using an IP protocol. Node 602 includes a SCCP-IP 626, which defines a mechanism for establishing and maintaining connections for the application on the TCP/IP stack and provides an interface for message transport. Transmission control protocol (TCP) 628 and Internet protocol (IP) 630 form the protocol that governs the breakup of data messages into packets to be sent via IP and the reassembling and verification of the complete messages from packets received by IP. TCP 628 corresponds to a transport layer in the ISO/OSI model, while IP 630 corresponds to the network layer within the ISO/OSI model. Ethernet 632 provides the physical interface for transmitting data over an IP network. Of course, the data may be transferred by another mechanism used to communicate over an IP network.

Gateway 604 includes the necessary components to communicate with both types of networks. In particular, gateway 604 includes SCCP 634, MTP3 636, MTP2 638, and MTP1 640, which are used to provide communications with a SS7 network. In addition, gateway 604 also includes SCCP/IP 642, TCP 644, IP 646, and Ethernet 648 which provide the components necessary to communicate on an IP network. TCAP can either be connection oriented or connectionless. MAP makes use of mainly the connection oriented capabilities of TCAP. SCCP can be either connection oriented on connectionless. MAP/TCAP mainly uses the connectionless facilities of SCCP. TCAP is used to provide the connection to the MAP protocol. The SCCP-IP components illustrated in FIG. 6 provide connection management with the TCP components. In addition, SCCP header encoding and decoding is provided by this particular component. Also, this component provides an application program interface to the application, such as application 608.

Internetworking 650 is a gateway TCP message handling mechanism that provides for receiving and sending of TCP messages. Internetworking 650 provides the mechanism used to place SS7 messages into an IP packet and to remove SS7 from IP packets. In addition, internetworking 650 allows for SS7 message handling. Internetworking 650 provides signaling message internetworking along with SS7 to TCP connection maintenance internetworking, such as error control, congestion control, and connection status propagation. A pair of gateways, such as gateway 604, may be used to provide a virtual SS7 link between two nodes that communicate using SS7. Alternatively, a single gateway is sufficient depending on the implementation. TCAP 614 is a mechanism that provides transaction management with its peer TCAP 616, both of which serve the MAP application SMS (606 and 608) in this example. TCAP 614 and TCAP 616 communicate using the communication protocol and mechanism described in the previous paragraphs.

With reference now to FIG. 7, an illustration of a data packet sent over an IP network by a gateway is depicted in accordance with a preferred embodiment of the present invention. Data packet 700 includes a header 702, which is a standard 8 byte IP header. The payload area of data packet 700 contains a short gateway header 704, which is 34 bytes in this example. In the depicted example, gateway header 704 is a header for a short message service (SMS) MAP message. In addition, a message 706 is contained within the payload of data packet 700. In this example, message 706 is a SMS MAP message. This message is a variable TCAP message in the depicted example.

Turning next to FIG. 8, a table of fields used in a gateway header is depicted in accordance with a preferred embodiment of the present invention. Table 800 depicts data that may be used in SMS gateway header 704 in data packet 700. These fields within gateway header 704 are used to process the message within the IP packet when the IP packet is received by a gateway. In the depicted example, these fields are used with a short message service (SMS) as well as with other protocols. The gateway header is application independent. The fields are used to place the message within the IP packet with the gateway header containing the information necessary to extract the message from the packet and then route it on to the destination. In particular, gateway header 704 in FIG. 7 would include a network type 802, a protocol version 804, a universal data type (UDT) data format 806, a sequence control 808, SCCP class 810, return information 812, called party address 814, calling party address 816, spare 818, and data length 820.

Network type 802 provides information as to how the message is encoded. This field provides an indication of the network to which the message is being transferred. Protocol version 804 is used to correspond implementations of the protocol between the gateway and the remote application. UDT data format 806 is a field that provides a data format for decoding of messages. Sequence control 808, SCCP class 810, return information 812, calling party address 816, and data length 820 are fields that are normally found in a SCCP header.

The information in the gateway header as illustrated in table 800 is selected as a minimal set of information from SCCP header information that is available in a SS7 node at either end of the connection created by a gateway. The amount of information within the gateway header is selected to be sufficient to allow a SS7 node to continue routing the message associated with the gateway header.

The gateway may provide connections to one or more clients over an IP link. The gateway maintains a table of addresses used to translate an SS7 address of a SS7 node to form an IP address. In essence, the gateway acts as a multiplexer in which the chosen representation is a session on the gateway that uniquely identifies each connection. The sessions are required for all TCP connections as well as clients or SS7 nodes registered to the gateway. The implementation described in FIGS. 9–16 refers to an implementation in which the SCCP-IP acts both as a sever and client. In FIG. 17–25, the implementation depicted is one in which the SCCP-IP is always only a server on the gateway.

Figure 9:
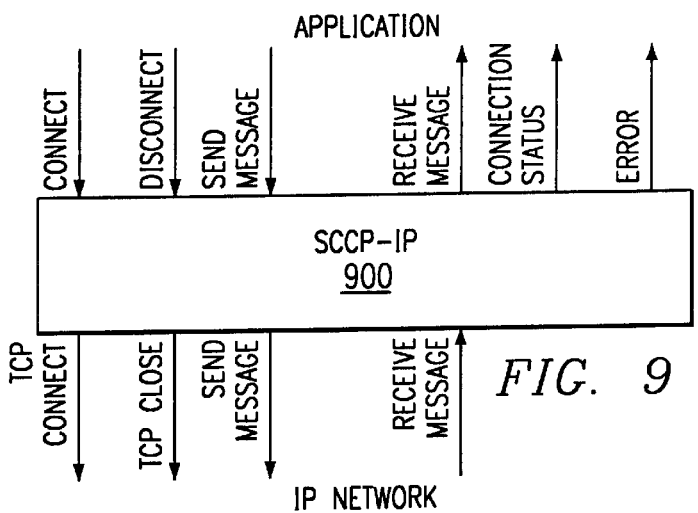
FIG. 9 is a block diagram of data flow for a SCCP-IP unit depicted in accordance with a preferred embodiment of the present invention.

In FIG. 9, a block diagram of data flow for a SCCP-IP unit is depicted in accordance with a preferred embodiment of the present invention. SCCP-IP 900 may be implemented either in SCCP-IP 642 in gateway 602 or in SCCP-IP 626 in node 604 in FIG. 6. SCCP-IP 900 interfaces between an application and an IP network. The application may be an application, such as application 608 in node 602 or internetworking 650 in gateway 604. SCCP-IP 900 may both act as a server and a client. The gateway has knowledge of SCCP-IP applications, which are transaction oriented and a connection is established at either end for a new TCAP transaction. In this instance, SCCP-IP is a server on the gateway and a client on the application.

SCCP-IP 900 may receive, connect, disconnect, and send message requests from an application. These request translate into TCP connect, TCP close, and send message requests that are sent on to an IP network by SCCP-IP 900. In response to receiving a message from the IP network, SCCP-IP 900 will send a received message to the application. In response to establishing a connection, SCCP-IP 900 may send the application connection status information. Errors also may be sent to the application by SCCP-IP 900.

The figures and flowcharts 10–13 illustrate processes employed by SCCP-IP 900 in FIG. 9.

Figure 10:
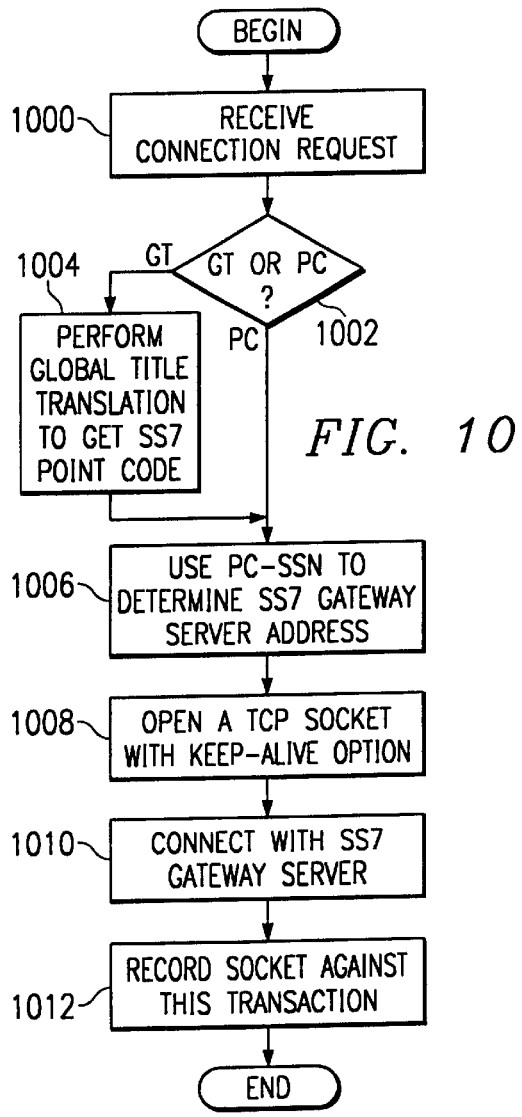
FIG. 10 is a flowchart of a process used by a SCCP-IP in response to a request to establish a connection depicted in accordance with a preferred embodiment of the present invention.

With reference now to FIG. 10, a flowchart of a process used by SCCP-IP 900 in response to a request to establish a connection is depicted in accordance with a preferred embodiment of the present invention. The process begins by receiving a connection request from the application (step 1000). Thereafter, a determination is made as to whether the request contains a global title (GT) translation or point code (PC) and subsystem number (SSN) (step 1002). The request made by the application for a connection is made by providing either a SCCP address either as a global title or a point code and subsystem number. When the address is a global title, such as an 800 number, then a global title translation is performed to obtain the point code and subsystem number (step 1004).

Thereafter, the point code and subsystem number is used to determine the gateway server address (step 1006). This process proceeds directly to this step from step 1002 if the request includes a point code and subsystem number. Step 1006 provides an IP address for the gateway server. Global title translation is a standard SS7 function that may be used to change signaling addresses to obtain a destination, which is identified by the point code, and an application at the destination, which is identified by the subsystem number. This information is preset for particular destinations. The identification may be made by interrogating a database containing the appropriate IP address for a particular point code and subsystem number.

Next, a TCP socket is opened with a keep-alive option (step 1008). In the depicted example, the keep-alive option is used to maintain the connection after establishment of the connection. In these examples the option is part of the IP protocol. This keep-alive option may be implemented in a number of ways depending on the design. For example, a timer may be set to a number of seconds on both ends of the communications link and on the expiration of the timer, each side will register the length as out of service and start a recovery procedure and repeat the procedure until successful. Detection of traffic on the length may cause the timer to be reset without expiring.

Then, a connection is made to a SS7 gateway server (step 1010). This connection is performed using known IP connection processes to send a message and receive a response to the message in the form of an acknowledgement. In response to a connection being made with the gateway server, then the socket is recorded against the transaction ID (step 1012) with the process terminating thereafter. In this instance, the point code and subsystem number is recorded along with the socket to allow translating a connection from SS7 to IP. At this point, a connection has been established.

Figure 11:
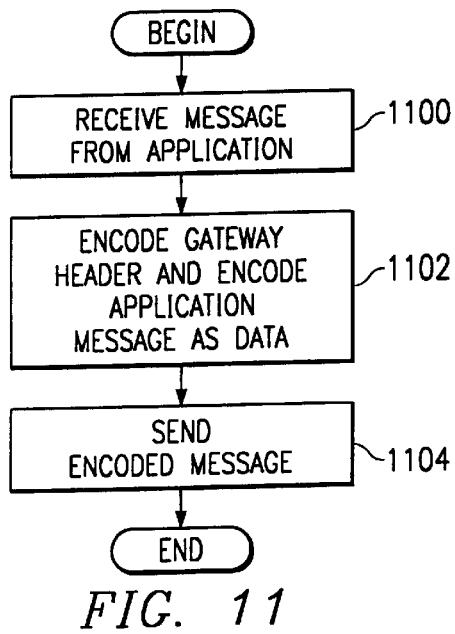
FIG. 11 is a flowchart of a process used in sending a message by a SCCP-IP depicted in accordance with a preferred embodiment of the present invention.

With reference now to FIG. 11, a flowchart of a process used in sending a message by a SCCP-IP is depicted in accordance with a preferred embodiment of the present invention. This process is used to transport SS7 messages, such as a message encoded using TCAP rules. The process begins by receiving a message from the application (step 1100). The message is encoded according to TCAP encoding rules. Upon receiving the message from the application, a gateway header is encoded and the message from the application also is encoded as data into a packet for transport on the IP network (step 1102). Thereafter, the encoded message is sent (step 1104). This encoded message is an IP data packet, such as data packet 700 in FIG. 7.

Figure 12:
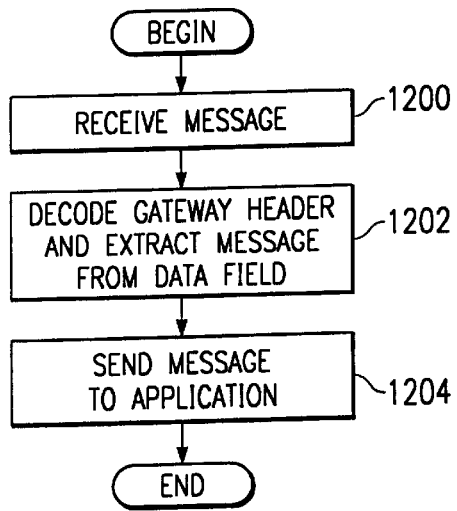
FIG. 12 is a flowchart of a process for processing a message received from an IP network by a SCCP-IP depicted in accordance with a preferred embodiment of the present invention.

With reference now to FIG. 12, a flowchart of a process for processing a message received from an IP network by a SCCP-IP is depicted in accordance with a preferred embodiment of the present invention. This process is used to process messages received from an IP network by the SCCP-IP. The process begins by receiving a message (step 1200). This message is in the form of a data packet used for transport on an IP network. The gateway header is decoded and the message is extracted from the data field in the data packets (step 1202). Thereafter, the message is sent to the application (step 1204) with the process terminating thereafter.

Figure 13:
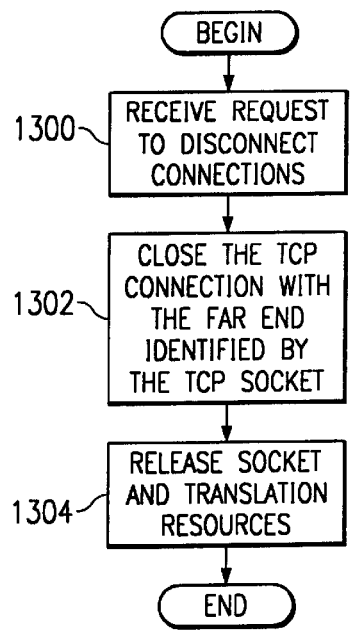
FIG. 13 is a flowchart of a process for releasing a connection depicted in accordance with a preferred embodiment of the present invention.

Turning next to FIG. 13, a flowchart of a process for releasing a connection is depicted in accordance with a preferred embodiment of the present invention. The process begins by receiving requests to disconnect connection (step 1300). Thereafter, the TCP connection is closed with the far end identified by the TCP socket (step 1302). Then, the socket is released along with transaction resources used in maintaining the socket (step 1304) with the process terminating thereafter.

Figure 14:
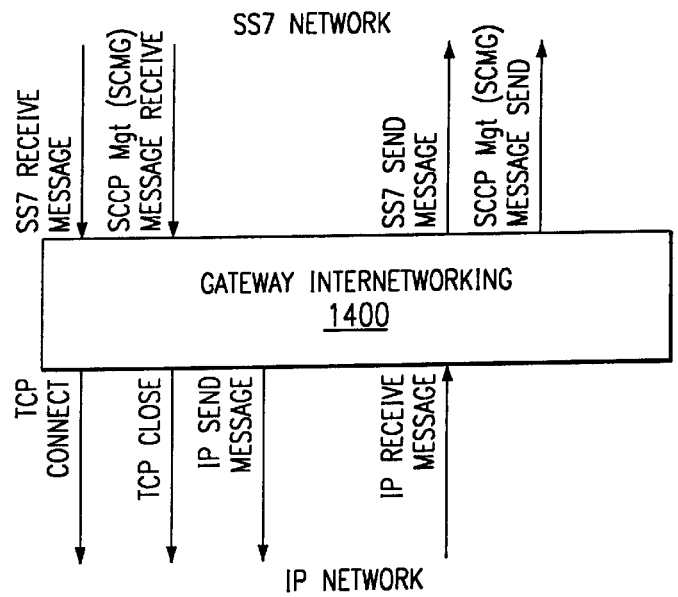
FIG. 14 is a block diagram of data flow in a gateway internetworking unit depicted in accordance with a preferred embodiment of the present invention.

Turning next to FIG. 14, a block diagram of data flow in a gateway internetworking unit is depicted in accordance with a preferred embodiment of the present invention. In this example, gateway internetworking 1400 may well send messages between a SS7 network and an IP network. Gateway internetworking 1400 may receive SS7 messages and SCCP management (SCMG) messages from a SS7 network. Gateway internetworking 1400 may send SS7 messages and also send SCMG messages to a SS7 network. In addition, gateway internetworking 1400 may connect and close TCP connections along with sending messages onto the IP network as well as received messages from the IP network.

Figure 15:
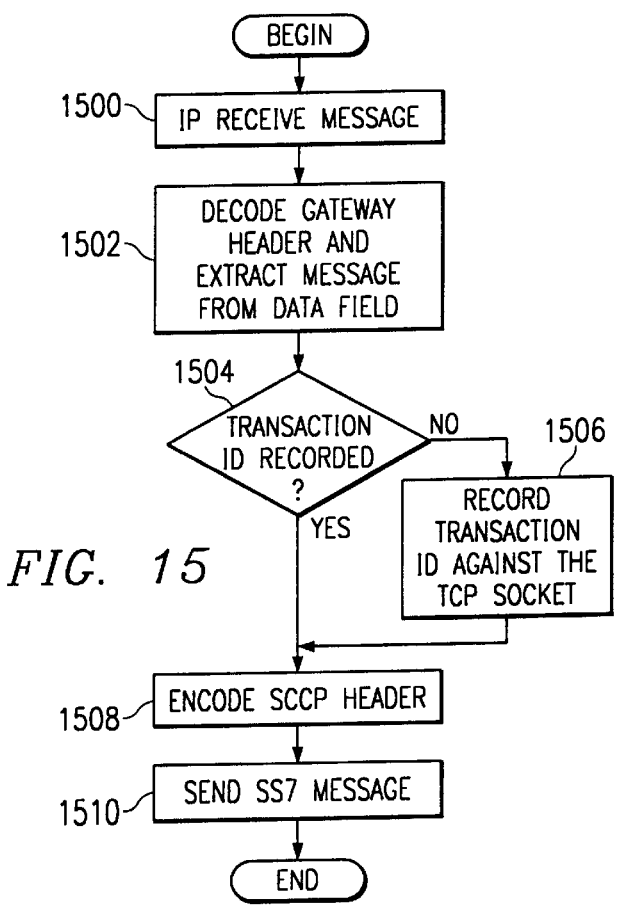
FIG. 15 is a flowchart of a process for receiving messages from an IP network by a gateway internetworking component depicted in accordance with a preferred embodiment of the present invention.
Figure 16:
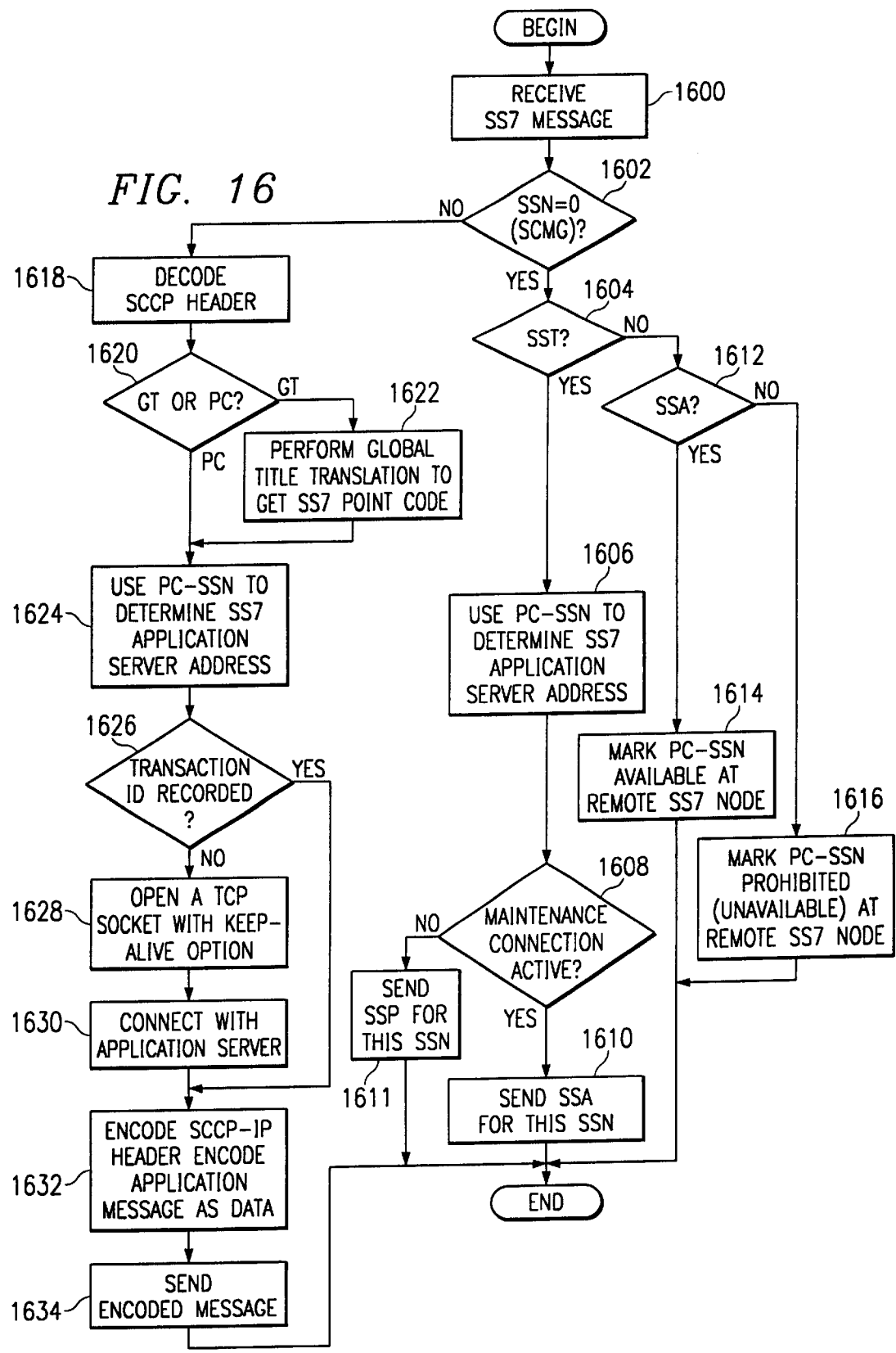
FIG. 16 is a flowchart of a process used to receive SS7 messages depicted in accordance with a preferred embodiment of the present invention.
Figure 17:
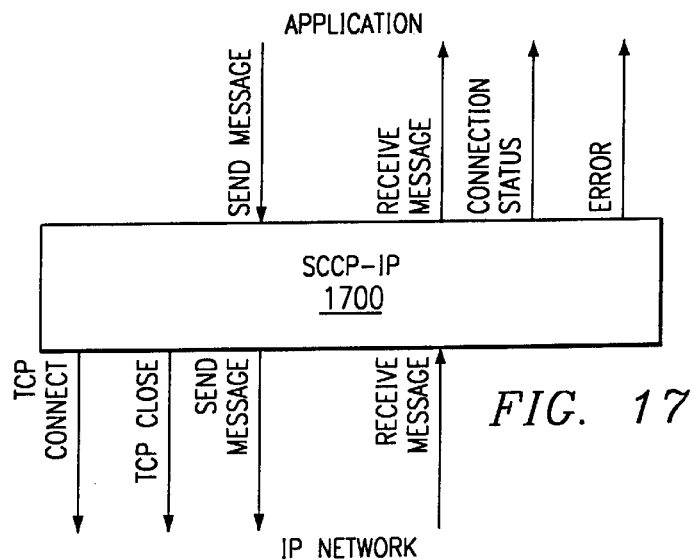
FIG. 17 is a diagram of data flow in a SCCP-IP used in establishing a single connection between a gateway and a client depicted in accordance with a preferred embodiment of the present invention.

The flowcharts in FIGS. 15 and 16 illustrate processes used by gateway internetworking 1400 in FIG. 14.

With reference now to FIG. 15, a flowchart of a process for receiving messages from an IP network by a gateway internetworking component is depicted in accordance with a preferred embodiment of the present invention. This process is used to identify connections to another node or gateway on the IP network. The process begins by receiving an IP message (step 1500). Thereafter, the gateway header is decoded and the message is extracted from the data field of the IP message (step 1502). A determination is then made as to whether a transaction ID has been recorded for this message (step 1504). If a transaction ID has not been recorded, then a transaction ID is recorded against the TCP socket (step 1506). The determination is made by querying a database of connections for known sockets to see if the transaction ID is associated with the particular socket. If the transaction ID has been recorded, then after the recording of the transaction ID a SCCP header is encoded (step 1508) and a SS7 message is then sent (step 1510) with the process terminating thereafter.

With reference now to FIG. 16, a flowchart of a process used to receive SS7 messages is depicted in accordance with a preferred embodiment of the present invention. The process begins by receiving a SS7 message (step 1600). Thereafter, a determination is made as to whether the subsystem number (SSN) in the message is equal to zero (step 1602). A zero would indicate that a SCMG message has been received. If this determination is yes, then a determination is made as to whether the message is a subsystem test (SST) message (step 1604). A subsystem test message is used to inquire whether a remote peer SCCP application is available.

If the message is a subsystem test message then the point code and subsystem number are used to determine an SS7 application server address (step 1606). A determination is then made as to whether the maintenance connection is active (step 1608). If the maintenance connection is active, then a subsystem allowed message (SSA) is sent for the particular subsystem number as a SCMG message (step 1610) with the process terminating thereafter. If the connection is not alive, the SSP for the SSN is sent (step 1611) with the process then terminating. In SS7, subsystem number zero is a reserved number that corresponds to a SCCP management SCMG message.

With reference again to step 1604, if the determination made as to whether the message is a subsystem test message is no, then the process determines whether the message is a subsystem allowed message (step 1612). This determination is used to handle non-SST subsystem messages. If the message is a subsystem allowed message, the process then marks the point code and subsystem number as being available at the remote SS7 node (step 1614) with the process terminating thereafter. Otherwise, the point code subsystem number is marked as being prohibited or unavailable at the remote SS7 node (step 1616) with the process terminating thereafter.

With reference again to step 1602, if the subsystem number is not equal to zero, then the SCCP header is decoded (step 1618). A determination is then made as to whether a global title or a point code is contained within the header (step 1620). If a global title (GT) is present, then a global title translation is performed to obtain a SS7 point code (step 1622). Thereafter, the point code and subsystem number are used to determine a SS7 application server address (step 1624). With reference again to step 1620, if a point code is present, the process proceeds directly to step 1624.

Next, a determination is made as to whether a transaction ID has been recorded for this particular socket (step 1626). If a transaction ID has not been recorded, the process then opens a TCP socket with a keep-alive option (step 1628). Thereafter, a connection is made with the application server (step 1630).

When the connection has been established, a SCCP-IP header is encoded along with the application message being placed in a data packet as data (step 1632). Thereafter, the encoded message is sent resulting in the sending of the message on the IP network (step 1634) with the process terminating thereafter.

With reference to step 1626, if a transaction ID has been recorded, the process then proceeds to step 1632 as described above.

FIGS. 17–25 illustrate and embodiment in which the SCCP-IP is always a server on the gateway. Next in FIG. 17, a diagram of data flow in a SCCP-IP used in establishing a single connection between a gateway and a client is depicted in accordance with a preferred embodiment of the present invention. SCCP-IP 1700 may receive a message to be sent from an application. In addition, SCCP-IP may open and close TCP connections along with sending messages to the IP network on opened TCP connections. SCCP-IP may receive messages on the connection and send the message on to an application in addition to providing the application with the connection status and identification of errors.

Figure 18:
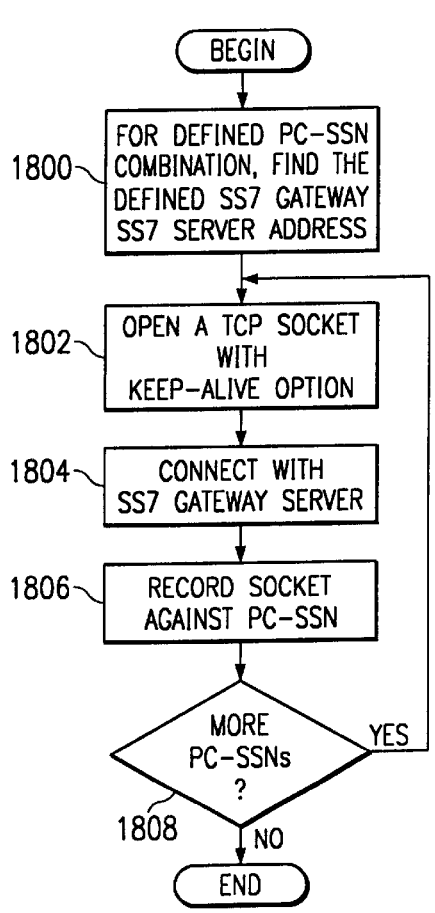
FIG. 18 is a flowchart of a process for establishing a connection depicted in accordance with a preferred embodiment of the present invention.
Figure 19:
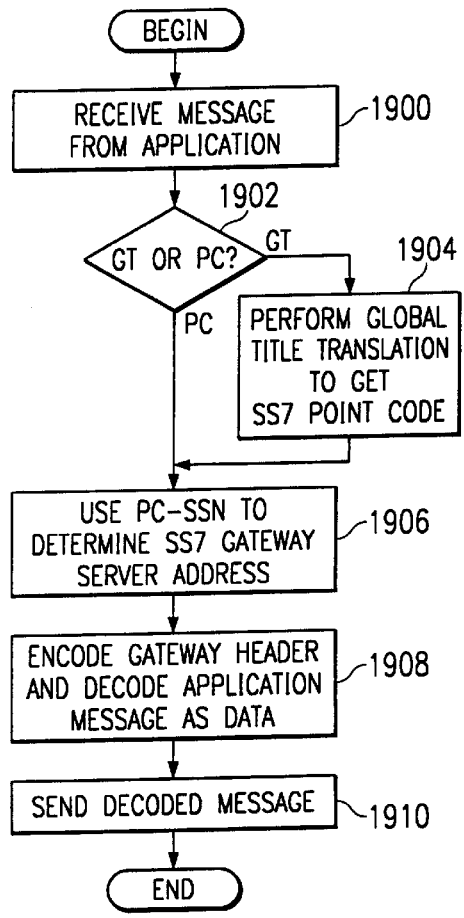
FIG. 19 is a process for sending messages depicted in accordance with a preferred embodiment of the present invention.

The processes illustrated in FIGS. 18–20 are those used by an SCCP-IP in establishing a single connection. In addition, this single connection may be established between two gateways.

With reference now to FIG. 18, a flowchart of a process for establishing a connection is depicted in accordance with a preferred embodiment of the present invention. The process begins by finding a server address for the particular point code and subsystem number combination (step 1800). Thereafter, a TCP socket for the server address is opened with the keep-alive option (step 1802). Thereafter, a connection is made with the SS7 gateway server (step 1804). The socket is recorded with the point code and subsystem number (step 1806). Thereafter, a determination is made as to whether additional point code and subsystem number combinations are present for processing (step 1808). If additional point code and subsystem number combinations are present for processing, the process then returns to step 1802. Otherwise, the process terminates.

With reference now to FIG. 19, a process for sending messages is depicted in accordance with a preferred embodiment of the present invention. This figure illustrates the process used by SCCP-IP 1700 in FIG. 17 to send messages received from an application. The process begins by receiving a message from the application to be sent to a destination (step 1900). The message received is an encoded message from the application. The message is encoded using TCAP encoding rules. In addition, an SCCP address is provided either as a global title or point code and SCCP subsystem number. In step 1902, a determination is made as to which type of address has been provided. If the address is a global title, then a global title translation is performed to obtain the is SS7 point code (step 1904). The process then uses the point code and subsystem number to identify a gateway server address (step 1906). The process proceeds directly to step 1906 from step 1902 if the address provided by the application is a point code. Next, the SCCP-IP header is encoded along with decoding the application message as data within a data packet for transport on an IP network (step 1908). Thereafter, the decoded message is then sent to the IP network (step 1910) with the process terminating thereafter.

Turning to FIG. 20, a flowchart of a process for processing received messages is depicted in accordance with a preferred embodiment of the present invention. This flowchart is used to describe the processing of messages received from an IP network. The process begins by receiving a message (i.e., IP data packet) from the IP network (step 2000). Thereafter, the gateway header is decoded and the message is extracted from the data field of the data packet received from the IP network (step 2002). Thereafter, the message is forwarded to the application (step 2004) with the process terminating thereafter.

With reference now to FIG. 21, a block diagram of data flow in a gateway internetworking unit is depicted in accordance with a preferred embodiment of the present invention. Gateway internetworking unit 2100 may receive SS7 messages and SCCP management messages from a SS7 network. In response, gateway internetworking unit 2100 may send IP messages onto the IP network. In addition, IP messages may be received and sent to destinations on the SS7 network. Also, TCP connect and TCP close request may be received by gateway internetworking unit 2100.

In FIG. 22, a flowchart of a process for receiving messages is depicted in accordance with a preferred embodiment of the present invention. The process begins by receiving an IP data packet from the IP network (step 2200). Thereafter, the gateway header is decoded and the message is extracted from the data field of the IP data packet received from the IP network (step 2202). A determination is then made as to whether the address is a global title or point code and subsystem number address (step 2204). If the address is a global title address, a global title translation is performed to derive a SS7 point code address (step 2206). Thereafter, the process encodes a SS7 SCCP header (step 2208). The process also proceeds directly to step 2208 from step 2204 if the address has a point code address. Next, a message is sent to the node identified by the point code and subsystem number (step 2210) with the process terminating thereafter.

Figure 23:
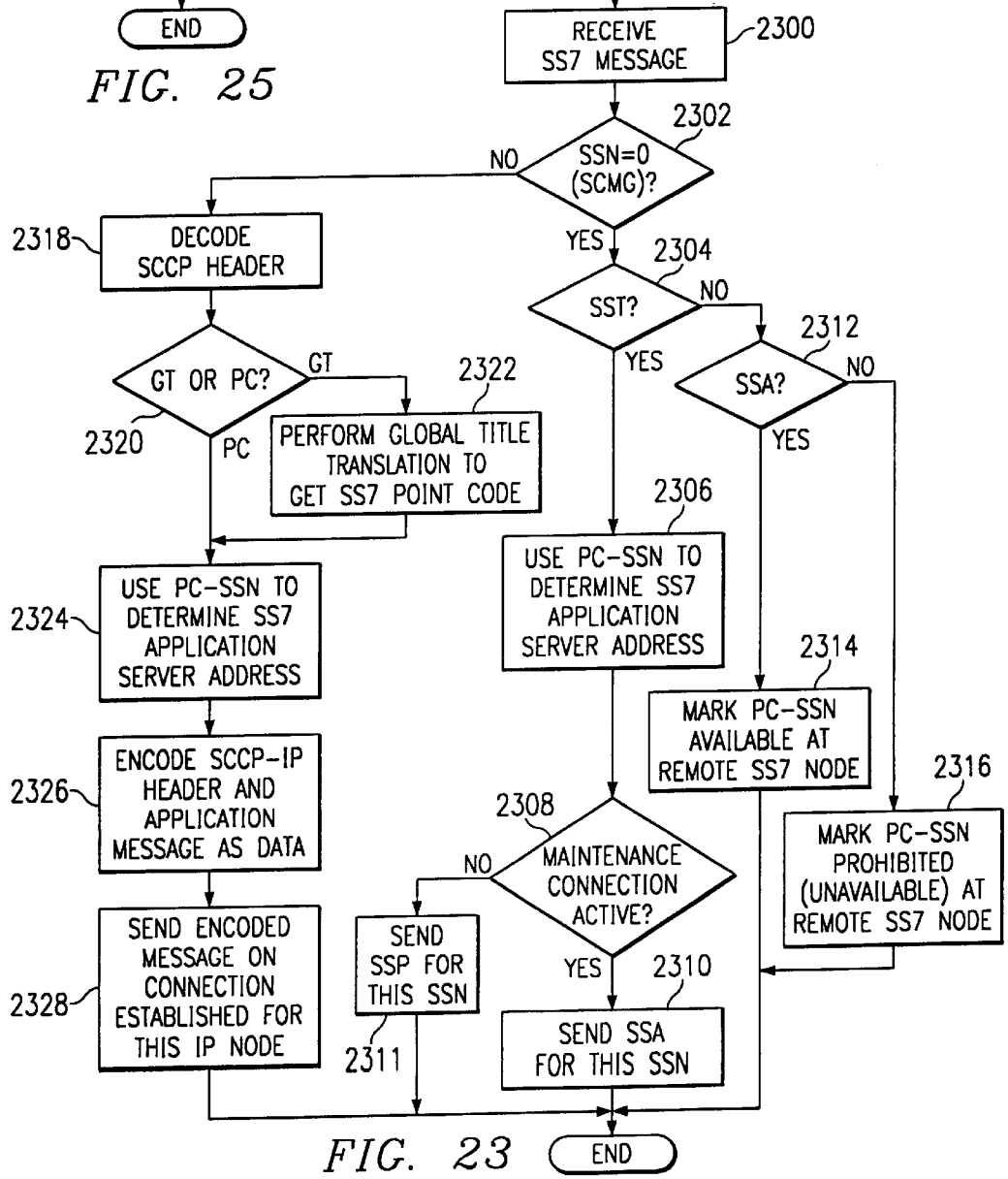
FIG. 23 is a process for handling SS7 messages depicted in accordance with a preferred embodiment of the present invention.

With reference now to FIG. 23, a process for handling SS7 messages is depicted in accordance with a preferred embodiment of the present invention. The process begins by receiving a SS7 message (step 2300). Thereafter, a determination is made as to whether the subsystem number in the message is equal to zero (step 2302). A zero would indicate that a SCMG message has been received. If this determination is yes, then a determination is made as to whether the message is a subsystem test (SST) message (step 2304). If the message is a subsystem test message then the point code and subsystem number are used to determine a SS7 application server address (step 2306). A determination is then made as to whether the connection is alive (step 2308). If the connection is alive, then a subsystem allowed message is sent for the particular subsystem number as a SCMG message (step 2310) with the process terminating thereafter. If the connection is not alive in step 2308, the SSP for the SSN is sent (step 2311) with the process then terminating. In SS7, subsystem number zero is a reserved number that corresponds to a SCCP management (SCMG) message. A subsystem test message is used to verify that a connection is present between peer SCCP and applications, send a message between peers to establish a connection in this example.

With reference again to step 2304, if the SS7 message is not a subsystem test message, a determination is made as to whether the message is a subsystem allowed (SSA) message (step 2312). If the message is a subsystem allowed message, the process then marks the point code and subsystem number as being available at the remote SS7 node (step 2314) with the process terminating thereafter. Otherwise, the point code and subsystem number is marked as being prohibited or unavailable at the remote SS7 node (step 2316) with the process terminating thereafter.

With reference again to step 2302, if the SCCP subsystem is not equal to zero, then the SS7 message is parsed and the SCCP header is decoded (step 2318). Thereafter, a determination is made as to whether the header includes a global title or point code address (step 2320). If the address is a global title, the process then performs a global title translation to obtain the SS7 point code (step 2322). Thereafter, the point code and subsystem number are used to determine a SS7 application server address (step 2324).

With reference again to step 2320, if the address is a point code address, the process proceeds to step 2324 as described above. Next, a gateway header is encoded along with the application message into the data field of an IP data packet (step 2326). The encoded messages are then sent on the connection established for the particular IP nodes (step 2328) with the process terminating thereafter.

In FIG. 24, a flowchart of a process for encapsulating a message into a data packet is depicted in accordance with a preferred embodiment of the present invention. This process is used to create data packets for transport on an IP network using messages designed for transport on a SS7 network. The process begins by receiving a message that is to be sent over an IP connection (step 2400). A gateway header is created for the message (step 2402). This gateway header contains information such as that found in table 800 in FIG. 8. A destination on the IP network is identified for the message (step 2404). This destination is in the form of an IP address. With this IP address, a data packet header is created for the data packet (step 2406). Thereafter, the gateway header and message are placed into the payload of the data packet (step 2408) with the process terminating thereafter.

Figure 25:
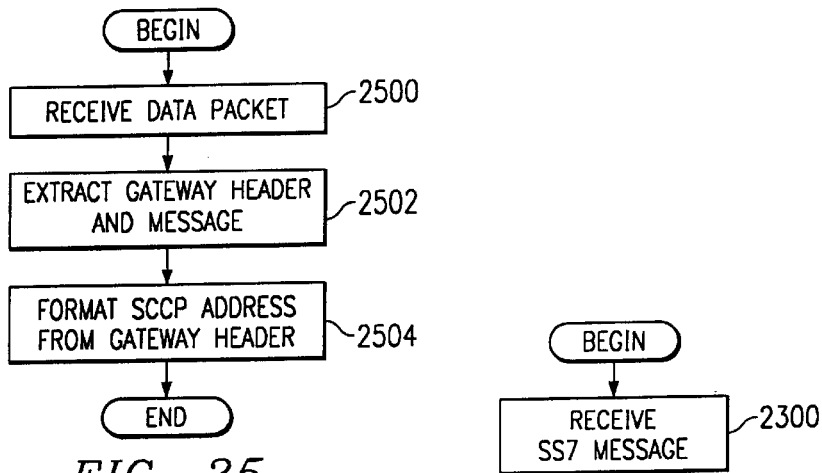
FIG. 25 is a flowchart of a process for extracting a message from a data packet depicted in accordance with a preferred embodiment of the present invention.

With reference now to FIG. 25, a flowchart of a process for extracting a message from a data packet is depicted in accordance with a preferred embodiment of the present invention. This process begins by receiving a data packet (step 2500). The gateway header and message are extracted from the payload portion of the data packet (step 2502). With the information from the gateway header, a SCCP address is formatted (step 2504) with the process terminating thereafter. At this point, the message may be routed to the appropriate node or application using the SCCP address. This message may be placed into existing SCCP interfaces in the SS7 network for routing.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted examples illustrate the use of TCP in handling the transport of messages over an IP link, other protocols also may be used, such as universal datagram protocol (UDP). UDP is a connectionless protocol within TCP/IP that corresponds to the transport layer in the ISO/OSI model. UDP converts data messages generated by an application into packets to be sent via IP but does not verify that messages have been delivered correctly. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for transferring signaling data within a network, the method comprising:

receiving a message for transfer to a node, wherein the message is received using a first protocol;

placing the message in a data packet using a second protocol to create the data packet;

placing routing information into the data packet, wherein the routing information is used by the first protocol for processing of the packet at the node;

establishing a connection to the node, wherein the connection uses the second protocol to send data packets; and sending the data packet to the node through the connection.

2. The method of claim 1, further comprising:

receiving a data packet, wherein the data packet is a received data packet containing a message and routing information;

extracting the message and routing information from the received data packet; and processing the message using the routing information.

3. The method of claim 2, wherein processing comprises:

sending the message to a node based on the routing information.

4. The method of claim 1, wherein the first protocol is a SS7 protocol.

5. The method of claim 4, wherein the second protocol is an Internet protocol.

6. The method of claim 1, wherein the method is executed in a signaling point in a signaling network.

7. The method of claim 1, wherein the first protocol is a connectionless protocol and wherein the second protocol is a connection oriented protocol.

8. A signaling system comprising:

a SS7 signaling network, wherein the signaling network uses messages to manage connections within a communications network, wherein the messages used to manage connections are transported within the SS7 signaling network using a SS7 protocol;

a first gateway connected to the signaling network, wherein the gateway receives a message used to manage connections, places the message in a data packet, transports the message over a connection governed by an Internet protocol, wherein the message remains formatted for use with the SS7 protocol after having been placed in the data packet; and a second gateway in communication with the first gateway using the connection, wherein the second gateway receives the data packet, extracts the message from the data packet, and sends the message to a destination using the SS7 protocol, wherein the gateway includes:
a signaling connection control part and a message transfer part used to communicate with the SS7 network;
a transmission control protocol and a Internet protocol used to communicate with the gateway;
first processing means for placing messages into data packets for transport using the Internet protocol; and
second processing means for extracting messages from data packets for transport using the SS7 protocol, and wherein the first processing means comprises:
determining means for determining an Internet protocol address from a signaling connection control part address;
first creating mean for creating a gateway header containing data used to recreate the signaling connection control part address;
placing means for placing the message and the gateway header into a data packet; and
second creating means for creating a header of the data packet using the Internet protocol address.

9. The signaling system of claim 8, wherein the signaling connection control part address includes a point code and a subsystem number.

10. The signaling system of claim 8, wherein the SS7 signaling network includes a plurality of signaling points and wherein the first gateway and the second gateway provide a data channel between a plurality of signaling points within the SS7 signaling network.

11. The signaling system of claim 8, wherein the Internet protocol is a transport control protocol.

12. The signaling system of claim 8, wherein the Internet protocol is user datagram protocol.

13. The signaling system of claim 8, wherein the second gateway is connected to the SS7 signaling network and wherein the destination is a node in the SS7 signaling network.

14. The signaling system of claim 8, wherein the destination is a node external to the SS7 signaling network.

15. A node comprising:
a signaling connection control part and a message transfer part used to communicate with a SS7 network, wherein messages are routed within the SS7 network using a signaling connection control address;
a transmission control protocol and a Internet protocol used to communicate with the gateway;
first processing means for placing messages into data packets for transport using the transmission control protocol and Internet protocol; and
second processing means for extracting messages from data packets for transport using the SS7 protocol, wherein the first processing means comprises:
creating a header containing data used to recreate the signaling connection control part address; and
placing the message and the header into a data packet.

16. The node of claim 15, further comprising:
determining means for determining an Internet protocol address from the signaling connection control part address; and
connection means for creating a connection using the Internet protocol address, wherein the connection is used to send data packets using the second protocol.

17. The node of claim 15, wherein the node is a signaling point in a SS7 network.

18. The node of claim 15, wherein the node is a gateway.

19. A data processing system for transferring signaling data within a network, the data processing system comprising:
receiving means for receiving a message for transfer to a node, wherein the message is received using a first protocol;
first placing means for placing the message in a data packet using a second protocol to create the data packet;
second placing means for placing routing information into the data packet, wherein the routing information is used by the first protocol for processing of the packet at the node;
establishing means for establishing a connection to the node, wherein the connection uses the second protocol to send data packets; and
sending means for sending the data packet to the node through the connection.

20. The data processing system of claim 19 further comprising:
receiving means for receiving a data packet, wherein the data packet is a received data packet containing a message and routing information;
extracting means for extracting the message and routing information from the received data packet; and
processing means for processing the message using the routing information.

21. The data processing system of claim 20, wherein the processing means comprises:
sending means for sending the message to a node based on the routing information.

22. The data processing system of claim 19, wherein the first protocol is a SS7 protocol.

23. The data processing system of claim 19, wherein the method is executed in a signaling point in a signaling network.

24. A computer program product for transferring signaling data within a network, the computer program product comprising:
first instructions for receiving a message for transfer to a node, wherein the message is received using a first protocol;
second instructions for placing the message in a data packet using a second protocol to create the data packet;
third instructions for placing routing information into the data packet, wherein the routing information is used by the first protocol for processing of the packet at the node;
fourth instructions for establishing a connection to the node, wherein the connection uses the second protocol to send data packets; and
fifth instructions for sending the data packet to the node through the connection.

25. A method in a network for transporting signaling data between a first node and a second node in the network, wherein signaling data is transmitted within the network using a first protocol, the method comprising:
receiving signaling data for transfer from the first node to the second node using the first protocol;
placing the signaling data into a data packet for transport using a second protocol;
establishing a communications link between the first node and the second node using a second protocol; and sending the data packet from the first node to the second node using the second protocol, wherein placing the signaling data into a data packet for transport using a second protocol includes providing a gateway header in a payload area of the data packet, and wherein the gateway header includes information used to extract the signaling data from the data packet and route it to a destination using the first protocol.

26. The method of claim 25, wherein the gateway header includes one or more of a network type, a protocol version, a universal data type data format, a sequence control, a SCCP class, return information, called party address, calling party address, and data length.

27. The method of claim 25, further comprising:

receiving the data packet at a gateway;

extracting the gateway header and signaling data from the payload area of the data packet;

formatting an SCCP address based on the information in the gateway header; and routing the signaling data to the second node using the SCCP address.

28. A method in a network for transporting signaling data between a first node and a second node in the network, wherein signaling data is transmitted within the network using a first protocol, the method comprising:

receiving signaling data for transfer from the first node to the second node using the first protocol;

placing the signaling data into a data packet for transport using a second protocol;

establishing a communications link between the first node and the second node using a second protocol; and sending the data packet from the first node to the second node using the second protocol, wherein placing the signaling data into a data packet for transport using a second protocol includes providing a gateway header in a payload area of the data packet, and wherein establishing a communications link between the first node and the second node includes:

receiving, in an SCCP-IP unit, a request from the first node, wherein the request includes a point code and subsystem number;

determining a gateway server address based on the point code and subsystem number;

opening a TCP socket with a keep-alive option;

establishing a connection with the gateway server using the TCP socket; and recording the socket, point code and subsystem number against a transaction identifier.

\* \* \* \* \*